(12) United States Patent  (10) Patent No.: US 9,291,782 B2
Skepnek et al.  (45) Date of Patent: Mar. 22, 2016

(54) MULTI-CHANNEL TRANCEIVER MODULE

(75) Inventors: Robert Skepnek, Chicago, IL (US);
Alexandros Pirillis, Chicago, IL (US);
Joseph Llorens, Winfield, IL (US);
William Thomas Freed, Loomis, CA (US)

(73) Assignee: Methode Electronics, Inc., Chicago, IL (US)

( * ) Notice: Subject to any disclaimer, the term of this patent is extended or adjusted under 35 U.S.C. 154(b) by 717 days.

(21) Appl. No.: 13/175,415

(22) Filed: Jul. 1, 2011

(65) Prior Publication Data
US 2013/0004131 A1  Jan. 3, 2013

(51) Int. Cl.
*G02B 6/36* (2006.01)
*G02B 6/42* (2006.01)

(52) U.S. Cl.
CPC .................................... *G02B 6/4201* (2013.01)

(58) Field of Classification Search
CPC .............................. G02B 6/4201; G02B 6/4246
See application file for complete search history.

(56) References Cited

U.S. PATENT DOCUMENTS

| 5,325,454 | A | * | 6/1994 | Rittle et al. ...................... 385/76 |
| 5,367,159 | A | | 11/1994 | Schofield et al. |
| 5,386,487 | A | * | 1/1995 | Briggs et al. .................... 385/59 |
| 5,579,425 | A | * | 11/1996 | Lampert et al. ................ 385/59 |
| 5,675,682 | A | * | 10/1997 | De Marchi ...................... 385/77 |
| 6,240,228 | B1 | * | 5/2001 | Chen et al. ...................... 385/53 |
| 6,412,986 | B1 | * | 7/2002 | Ngo et al. ........................ 385/53 |
| 6,533,603 | B1 | * | 3/2003 | Togami ......................... 439/372 |
| 6,672,898 | B2 | * | 1/2004 | Kahle et al. ................. 439/540.1 |
| 6,832,858 | B2 | * | 12/2004 | Roth et al. ...................... 385/71 |
| 6,854,894 | B1 | * | 2/2005 | Yunker et al. ................... 385/53 |
| 6,994,478 | B1 | * | 2/2006 | Chiu et al. ...................... 385/88 |
| 7,013,088 | B1 | * | 3/2006 | Jiang et al. .................... 398/139 |
| 7,073,953 | B2 | * | 7/2006 | Roth et al. ...................... 385/88 |
| 7,195,404 | B1 | * | 3/2007 | Dudley .......................... 385/92 |
| 7,275,959 | B2 | | 10/2007 | Daly et al. |
| 7,405,942 | B1 | | 7/2008 | Lewis |
| 7,594,766 | B1 | * | 9/2009 | Sasser et al. .................... 385/89 |
| 7,613,393 | B2 | | 11/2009 | Aronson et al. |
| 2002/0193016 | A1 | * | 12/2002 | Bradley et al. ................ 439/790 |
| 2003/0059167 | A1 | * | 3/2003 | Chiu et al. ...................... 385/53 |
| 2003/0081293 | A1 | * | 5/2003 | Wood et al. ................... 359/172 |
| 2006/0062526 | A1 | * | 3/2006 | Ikeuchi .......................... 385/88 |
| 2007/0258682 | A1 | * | 11/2007 | Bright et al. .................... 385/55 |
| 2007/0259560 | A1 | * | 11/2007 | Matsumoto ................... 439/418 |

OTHER PUBLICATIONS

CentreCOM Multiport Transceivers webpages.

* cited by examiner

*Primary Examiner* — Uyen Chau N Le
*Assistant Examiner* — Chris Chu
(74) *Attorney, Agent, or Firm* — Gould & Ratner LLP

(57) ABSTRACT

The present invention provides a multi-channel transceiver module comprising a unitary housing having a first channel body and a second channel body. Each channel body includes a male plug end and a receptacle plug end. A bridge member is provided for joining the first and second bodies. The bridge members disposed at the receptacle end. A gap is provided between the plug ends of each channel body. The gap extends from each plug end to the bridge member to partially divide each channel so that each plug end is insertable within a separate receptacle cage.

32 Claims, 19 Drawing Sheets

MULTI-CHANNEL TRANCEIVER MODULE

The present invention pertains to a multi-channel transceiver module and, in particular, a grouping of transceiver modules combined in a unitary fashion, so that the multi-channel transceiver module may be mounted within multiple receptacle cages of a host device simultaneously.

BACKGROUND

Transceiver modules are well known for providing data communication solutions for data center hardware, such as routers, hubs, servers, or other high-speed data communication systems. Many of pluggable transceiver modules are known such as 1000 BASE-X/T fast Ethernet copper and optical modules. An individual transceiver module may be inserted or removed from a hardware host device when additional capacity is needed, or upgrading of the system, for example from copper to optical. Commonly known form factors for such transceiver modules include SFP, SFP+, CXP, or QSFP.

The host devices that receive these transceiver modules may have as many as sixty-four receptacle ports for receiving individual transceiver modules therein. In many applications, a metallic EMI cage will be provided on the mother board of the host device for receiving each of the individual transceiver modules in the receptacle cage.

Other systems are known for allowing individual transceiver modules to be mated in a single cage having multiple ports. For example, a multi-port receptacle system, including a monolithic cage for mounting on the mother board of a host device is described in U.S. Pat. No. 7,275,959, which is incorporated herein by reference. FIG. 1 depicts such a multi-port receptacle having four individual transceiver modules, 10, 20, 30, 40 received in cage 50. The first transceiver module 10 is shown being inserted into the open receptacle port channel of the cage 50. Because each of the four transceiver modules 10, 20, 30, 40 are independent and have separate housings for each channel, they must each be plugged into the cage 50 in a separate mating process. So, for example, where a host device has as many as sixty-four channels, it will require the operator in the field to install sixty-four separate transceiver modules using sixty-four separate insertion steps. In a rack which may hold as many as eight host devices, these insertion steps of the individual transceiver modules can be extremely time consuming and cumbersome. Also to be considered, is that a full data center may have multiple racks that must be populated with the transceiver modules—multiplying the task to thousands of insertion steps. It would be desirable to provide a module that reduces the number of insertion steps and allows for host devices to be populated more quickly and easily by field operators.

SUMMARY

The present invention provides for a multi-channel transceiver module comprising a unitary housing having at least a first channel body and a second channel body, each channel body having a male plug end and a receptacle end, a bridge member for joining the first and second channel bodies. The bridge member is disposed at the receptacle end and a gap is provided between the plug ends of each channel body, the gap extending from each plug end to the bridge member to partially divide each channel body, so that each plug end is insertable within a separate receptacle. The multi-channel transceiver may have the bridge member being co-extensive with an end face of the receptacle end, the end face surrounding an aperture that forms the receptacle adapted for receiving a cable plug. A first end face is provided at the first channel body and a second end face is provided at the second channel body, each end face being integrally joined by the bridge. The first and second end face define a plane and a first side of the bridge being generally co-extensive with the plane.

The multi-channel transceiver may have the receptacle ends and the bridge formed from the same material. The receptacle ends and the bridge may be stamped from the same metal. The receptacle ends and the bridge may be formed of a polymer material from the same mold. In an embodiment, the receptacle end may be closed and the transceiver is adapted to perform as a test module. In that embodiment, the transceiver may be a loop-back module so that a transmitted signal received by the transceiver is returned to the host device.

The multi-channel transceiver may further comprise a latch mechanism for securing the module housing within a cage of a receptacle of a host device to which the module housing is inserted. In an embodiment, the housing may further have a third channel body. In an embodiment, the latch mechanism may be disposed at the receptacle end of the channel body located in a center position of the housing. In an embodiment, the housing may further have a fourth channel body. The housing may include a pair of latch mechanisms and the pair of latch mechanisms may be located at the receptacle end of each of the channel bodies located in a center position of the housing. In an embodiment, each of the first and second channel bodies may be oriented side-by-side so that the bridge extends between a first sidewall of the first channel body and a second sidewall of the second channel body.

The multi-channel transceiver may have the first and second channel bodies oriented belly to belly, so that the bridge extends between a first bottom surface of the first channel body and a second bottom surface of the second channel body, each bottom surface including an aperture exposing contact blades at the male plug end. In an embodiment, at least one monolithic printed circuit board may be disposed within the housing and extend between the first channel body and the second channel body. The PCB may include components mounted thereon whose functionality is shared between the first channel and the second channel body. In an embodiment, a 10-gigabit PHY chip having a footprint of at least approximately 21 mm×21 mm is mounted on the PCB, so that the first channel and second channel may process data at a rate of up to 10-gigabits per second. In an embodiment, an extended housing is provided at the receptacle end for mounting the shared components, the extended housing in communication with each of the first and second channel bodies and the extended housing forming a cavity for receipt of a PCB having at least a 21 min×21 mm mounting area. In an embodiment, the PCB may be mounted within the extended housing and interconnected with circuitry provided at the male ping ends of each of the first and channel bodies.

A multi-channel transceiver may be provided wherein the transceiver is compliant with one of an SFP, SFP+, SFP to RJ45, CXP, CXP to RJ45, QSFP, and QSFP to RJ45 form factor. The multi-channel transceiver may include a support arm that extends from a bottom surface to support the receptacle end, the support arm being braced against a face plate through which the male plug end is inserted. The support arm may be retractably mounted at the receptacle end. The multi-channel transceiver may include a monolithic heat sink member that extends between the first channel body and the second channel body. The heat sink may include fins integrally formed with the housing. A bail lever extending between the first channel body and the second channel body may be provided and the bail lever for releasing a latch mechanism.

The invention may further provide a multi-channel transceiver module comprising monolithic housing having at least two channels, each channel having a first end forming a male plug end a second end forming a wall, the wall may be shared and extend between the first channel and the second channel. The wall is formed by a monolithic baser having a plane or major surface forming a single plane extending between the at least two channels. The base may include a first latch mechanism. The male plug may form an electrical connector that is mounted within a cut-out portion of the first end for mounting the multi-channel module to a receptacle cage of a host device. The housing may further include a gap dividing each channel at the first end. The gap extends along an insertion axis of the first end of the channel housing and the wall plane being perpendicular to the insertion axis. The wall at the first end may include a receptacle opening formed therein for receiving a cable plug end. The transceiver may act as a loopback testing module.

BRIEF DESCRIPTION OF THE DRAWINGS

The subject matter of the invention is particularly pointed out and distinctly claimed in the concluding portion of the specification. The invention, however, both as to structure and method of operation, may be understood by reference to the following description taken in conjunction with the claims and the accompanying drawings, of which:

FIG. 6b is a circuit diagram of the module depicted in FIGS. 2-6a;

DETAILED DESCRIPTION

Figure 2:
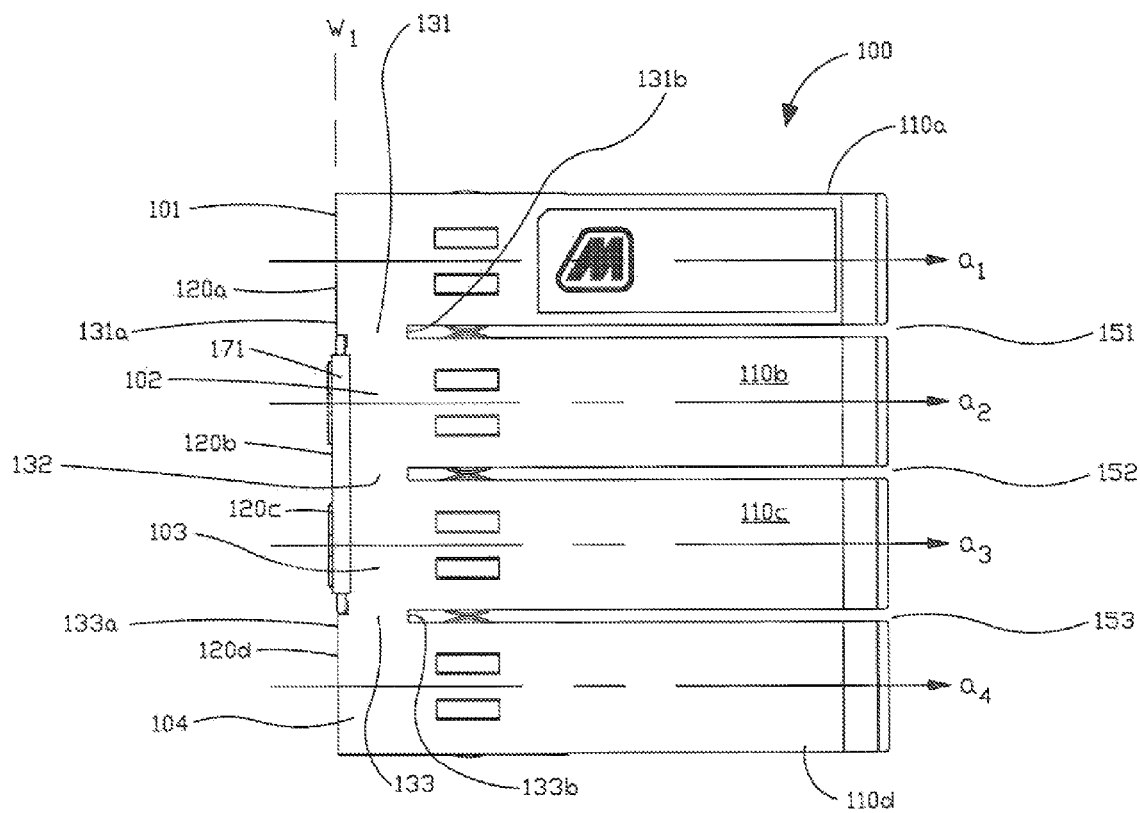
FIG. 2 is a plan view of the multi-channel transceiver module of the present invention.
Figure 3:
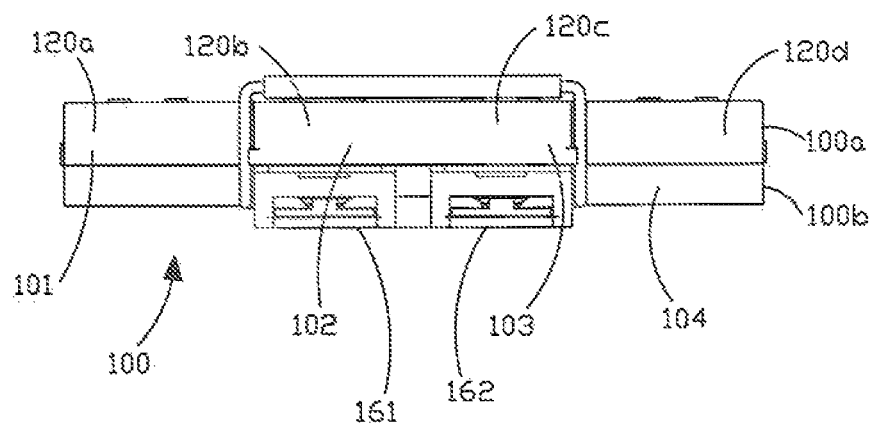
FIG. 3 is amend view showing the front face of the module of FIG. 2.
Figure 4:
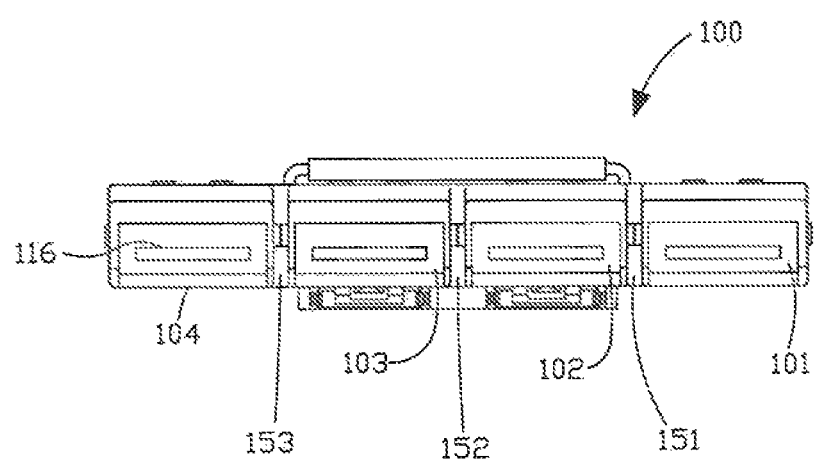
FIG. 4 is an end view of the rear face of the module of FIG. 2.
Figure 5:
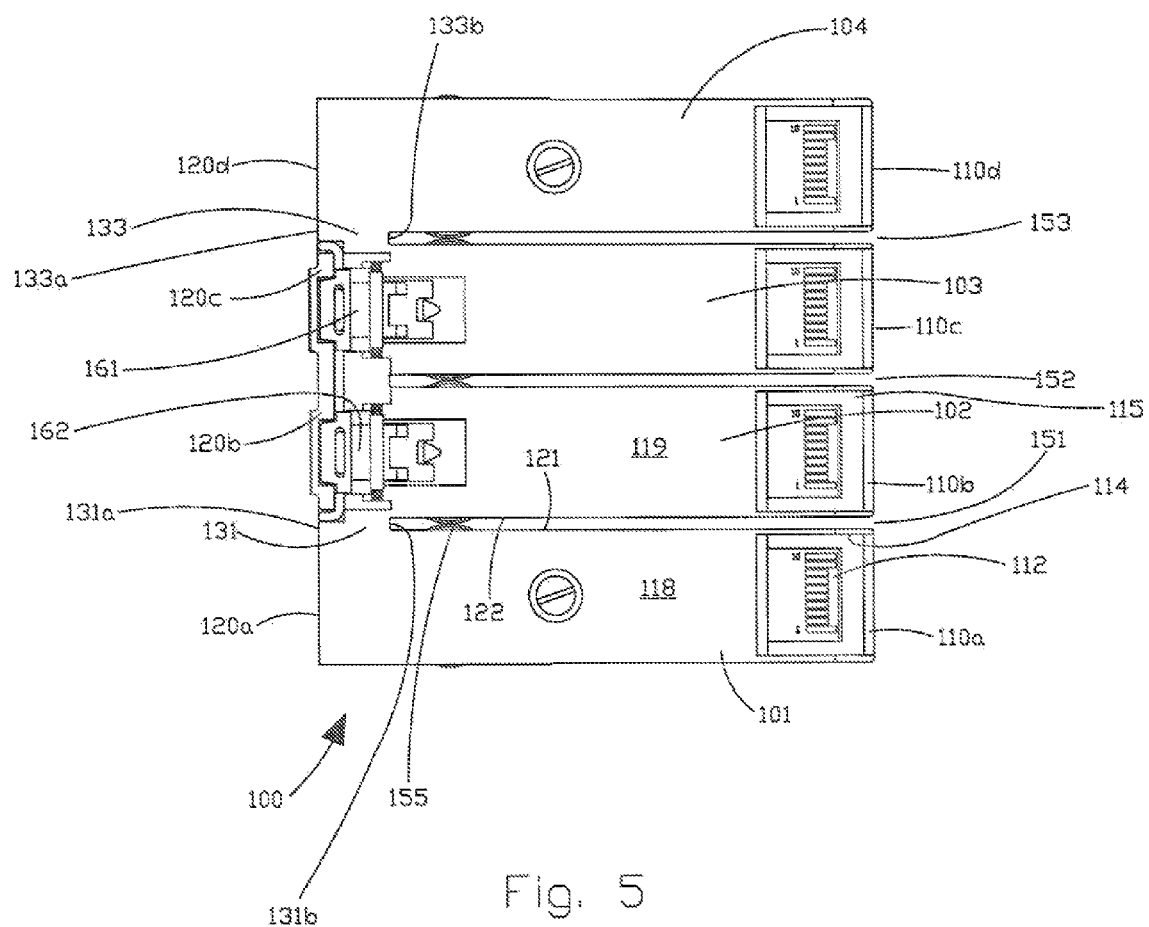
FIG. 5 is a bottom plan view of the module of FIG. 2.
Figure 6A:
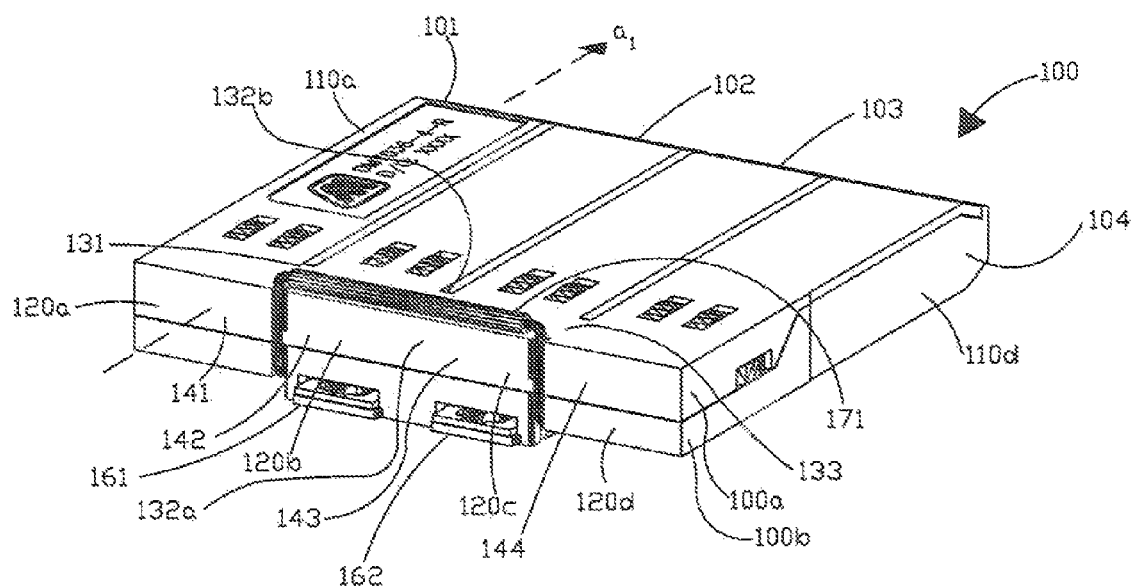
FIG. 6a is a perspective view of the module of FIG. 2.

A first embodiment of the multi-channel transceiver module of the present invention will be described with respect to FIGS. 2-6b. The module housing 100 forms a first channel body 101, second channel body 102, third channel body 103 and fourth channel body 104. In a preferred embodiment, the housing 100 is formed as a clam-shell type assembly including an upper half 100a and a lower half 100b (FIGS. 3, 6a). Each channel body provides an electronic channel for communication with the corresponding channel/port of a host device. For example, a host device such as a router or server may have twenty-four ports. The first four ports will have receptacle cages in each of the twenty-four ports. The multi-channel transceiver module of the present invention, as depicted in FIGS. 2-6b having four channels will be received in ports/sockets 1, 2, 3 and 4 of the host device. The entire module housing 100, being a unitary combination will be inserted simultaneously in ports 1-4 of the host device. Likewise, each of the remaining ports of the host device can be populated in, groups of four, using similar multi-channel transceiver modules as depicted FIGS. 2-6b. So an operator in the field need not insert twenty-four separate transceiver modules in each host port; rather with the present invention an operator need only insert a total of six module housings 100 into the ports of a host device having a total of twenty-four channels. The present invention also provides for multi-channel transceiver modules having other numbers of channel bodies such as 2, 3, 6, 8, 10 or 12 formed as a unitary housing (some of which will be described further below). It is further understood that host devices may have varying numbers of ports: from between six to sixty-four ports that can be populated by any combination of the multi-channel transceiver modules of the present invention, having various numbers of channel bodies.

Each channel body 101, 102, 103, 104 includes a male plug end 110a, b, c, d. Each male plug end includes a substrate including contact blades 112 (FIG. 5). The housing 100 includes a cut out portion 114 from which the contact blades 112 are exposed. In an embodiment, a secondary printed circuit board (PCB) forms the contact blades 112 and the combination of the blades on the printed circuit board substrate provides an electrical connector 116 (FIG. 4). Thus, it is to be understood that the male plug end 110a, b, c, d is received by a corresponding female connector of a host device residing in each receptacle cage of the host device. Such an electrical connector and receptacle cage is described in U.S. Pat. No. 7,275,951, which is incorporated herein by reference. Each male plug end 110a, b, c, d is inserted in the receptacle cage of a host device along a longitudinal insertion axis $a_1$, $a_2$, $a_3$, $a_4$ (FIG. 2) as shown in the direction of the arrowheads of FIG. 2. A cut-out 114 is formed in a first bottom surface 118 of the first channel body 101. Further, a cutout 115 is formed from the second bottom surface 119 of the second channel body 102.

Figure 6B:
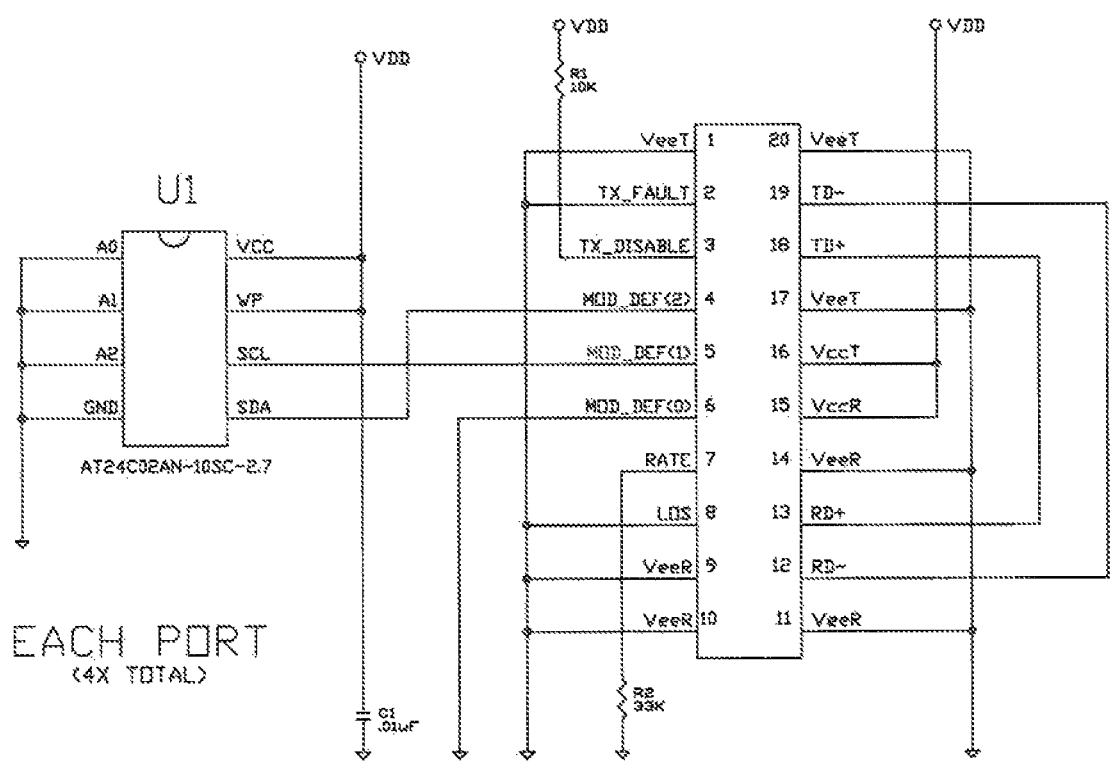

Each channel body 101, 102, 103, 104 includes a receptacle end 120a, b, c, d opposite the corresponding male plug end 110a, b, c, d. The receptacle end 120 may include a receptacle opening for receiving a cable plug end (as will be described in more detail below) or a closed faced when the multi-channel transceiver module is a test module, as depicted in FIGS. 2-6. The multi-channel transceiver module depicted in FIGS. 2-6 depicts an embodiment of an SFP loopback test module. The circuitry, for the module is depicted in FIG. 6b and provides for the receipt of a transmitted signal from a host device that is received by the transceiver and is returned to the host device to perform testing. Because this is a closed loop system there is no transmission from an external peripheral device needed through a cable. Such devices will be discussed for alternate embodiments described in more detail below.

The first channel housing 101 includes a first side wall 121 and the second channel housing 102 includes a second side wall 122. The first and second walls 121, 122 are facing each other, as depicted in FIG. 5. The first channel body 101 is connected to the second channel body 102 by a first bridge 131. The second channel body 102 is connected to the third channel body 103 by a second bridge 132 and the third channel body 103 is connected to the fourth channel body 104 by a third bridge 133. As shown in FIG. 5, the first bridge 131 extends between the first side wall 121 and the second side wall 122. In a preferred embodiment, the module housing 100 is formed so that each of the bridges 131, 132, 133 are formed in a monolithic combination with each of the channel bodies 101, 102, 103, 104. The first bridge 131 includes a first side 131a and a second side 131b and the third bridge 133 includes a first side 133a and second side 133b (FIG. 5). The second bridge 132 includes a first side 132a and a second side 132b (FIG. 6a).

Each receptacle end 120a, b, c, d of each of the channel bodies 101, 102, 103, 104 includes an end face forming a wall. The first end face 141 forms a wall at the receptacle end 120a of the first channel 101, second end face 142 forms a wall at the receptacle end 120b of the second channel 102, third end face 143 forms a wall at the receptacle end 120c of the third channel 103 and a fourth end face 144 forms a wall at the receptacle end 120d of the fourth channel 104 (FIG. 6a). Each end face 141, 142, 143, 144 is joined by the corresponding bridge 131, 132, 133. In particular, the first side of bridge 131a joins first end face 141 and second end face 142. The first side of the second bridge 132a joins the second end face 142 with the third end face 143 and the first side of the third bridge 133a joins the third end face 143 with the fourth end face 144. Thus, as depicted in FIG. 2 the end faces 141-144 form a wall which is in a plane $W_1$ and each of the end faces 141-144 are co-extensive with each bridge first side 131a, 132a, 133a and each co-extensive with the plane $W_1$ (FIG. 2). Thus as depicted in FIGS. 2-6, it is understood that a unitary housing 100 is formed that include each of the channel bodies 101-104 end faces 140-144 and bridges 131-133 formed from the same material. For example, each of those components may be cast from the same metal such as zinc/aluminum alloy or a polymer material such as 30% glass filled LCP (liquid crystal polymer) from the same mold. Each component may also be stamped out steel or brass. Such unitary formation of the module housing 100 can save material costs and lower the costs of the overall component.

While the channel bodies depicted in FIGS. 2-6 each have an end face 141-144 that is closed—as will be discussed in more detail below with respect to other embodiments—each end face 141-144 may have a receptacle opening formed therein. In an alternate embodiment, the present invention may have the first channel 101 assembled separately from the second channel 102 and the bridge 131 formed as a third component which includes mating members for attaching between the first channel first side wall 121 and the second channel 102 second side wall 121, 122. Although additional assembly and component and material costs will be incurred, the assembly of the multi-channel transceiver module 100 will still provide an advantage in the field in that it reduces the installation effort for the field technician who can insert the multi-channel module into a host device more quickly than, four single transceiver modules. In a further alternate embodiment, the bridge 131 may include a snap fit member, so that a first channel 101 may be quickly attached to a second channel 102, etc. In such a way the multi-channel module may be quickly configured to have any number of channel.

Each channel body 101, 102, 103, 104 includes a gap 151, 152, 153 formed between each channel body. The gap 151 extends from the plug end 110a to the second side of the bridge 131b (FIG. 5). In an embodiment, a ground member 155 may be disposed within the gap 151. As discussed above, each channel body 101, 102, 103, 104 is inserted into its own, receptacle cage in the direction of arrows $a_1$, $a_2$, $a_3$, $a_4$ (FIG. 2.) and the gaps 151, 152, 153 are provided so that each channel body 101, 102, 103, 104 resides in a separate receptacle cage. In an embodiment, the transceiver module housing 100 is inserted into the host device so that the channel body is inserted until the second side 131b of the wall 131 abuts the face plate surrounding the receptacle cage. The ground members 155 will abut the interior of each receptacle cage for each channel body 101, 102, 103, 104.

Figure 1:
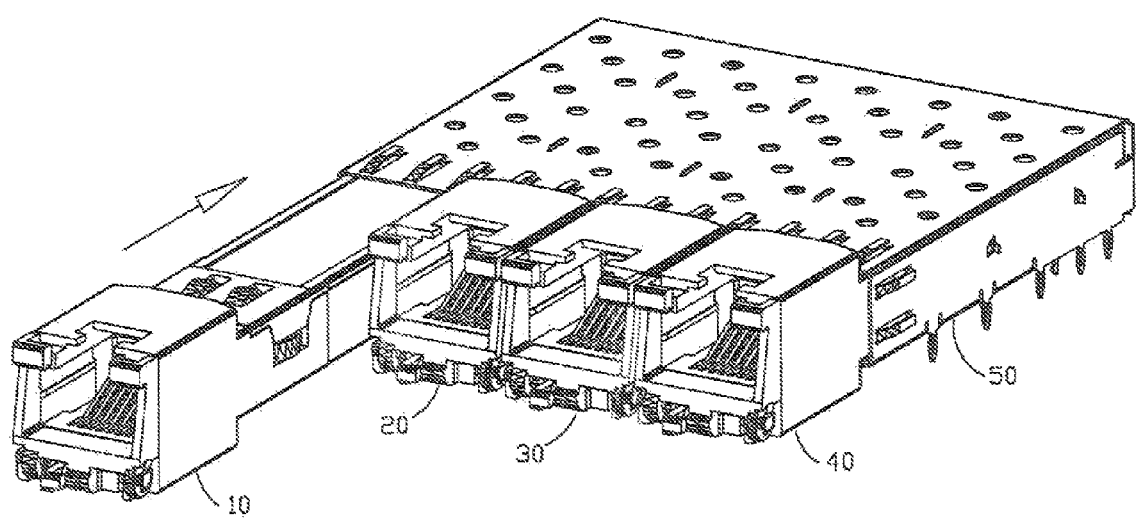
FIG. 1, is a perspective view of transceiver modules of the prior art.

The width of the gap 151, 152, 153 may vary depending on the configuration of the host device. For example if the host device includes a receptacle cage that is configured for multi-channel modules (for example, as shown in FIG. 1) the gap may be 0.033 of an inch. In an alternate embodiment, a standard receptacle cage originally configured for a single transceiver module may be accommodated by providing a gap 151 of 0.049 of an inch between each channel 101, 102, 103, 104 (see FIG. 16 below).

Each housing 100 includes a latching mechanism. As shown in FIGS. 2-6a a pair of latching mechanisms 161, 162 are provided. As depicted, the latching mechanisms 161, 162 are centered on the housing 100, so that latching mechanism 164, 162 are located along the bottom surface of the channel body at the receptacle end 120b, c. Such latching mechanisms 161, 162 are well known with respect to their individual locking features and are compatible with the Small Form Factor Multi-Source Agreement, which is incorporated herein by reference. However, it is to be understood that while there are four channel bodies 101-104 on the housing 100, in this embodiment there are two latching mechanisms, 161, 162, since the latching forces will be sufficient to maintain four channel bodies 101-104 within the host device that receives the module 100.

A bail/latch lever 171 is provided which extends between each of the latching mechanism 161, 162. By operation of the single bail lever 171, both of the latching mechanisms 161, 162 may be actuated. As is commonly know with respect to other latching mechanisms; the bail lever 171, as depicted in FIG. 6a, is in the closed position which maintains the module housing 100 within the host device. When it is desired to remove the module 100 from the host device, the bail lever 171 is rotated downward approximately 90° which causes the latch mechanism 161 to release. Then a user may pull on the lever 171, in the opposite direction of insertion axis $a_1$, $a_2$, $a_3$, $a_4$ in order to remove the module housing 100 from the host device. The bail lever 171 is also centered on the housing 100, so that pulling on the lever 171 provides an equal force across each channel 101-104 in order for each channel body 101-104 to be is removed simultaneously from its individual receptacle cage of the host device. The module depicted in FIGS. 2-6a conforms with a SFP form factor ftp://ftp.seagate.com/sff/INF-8074.PDF, which is incorporated herein by reference.

Figure 7:
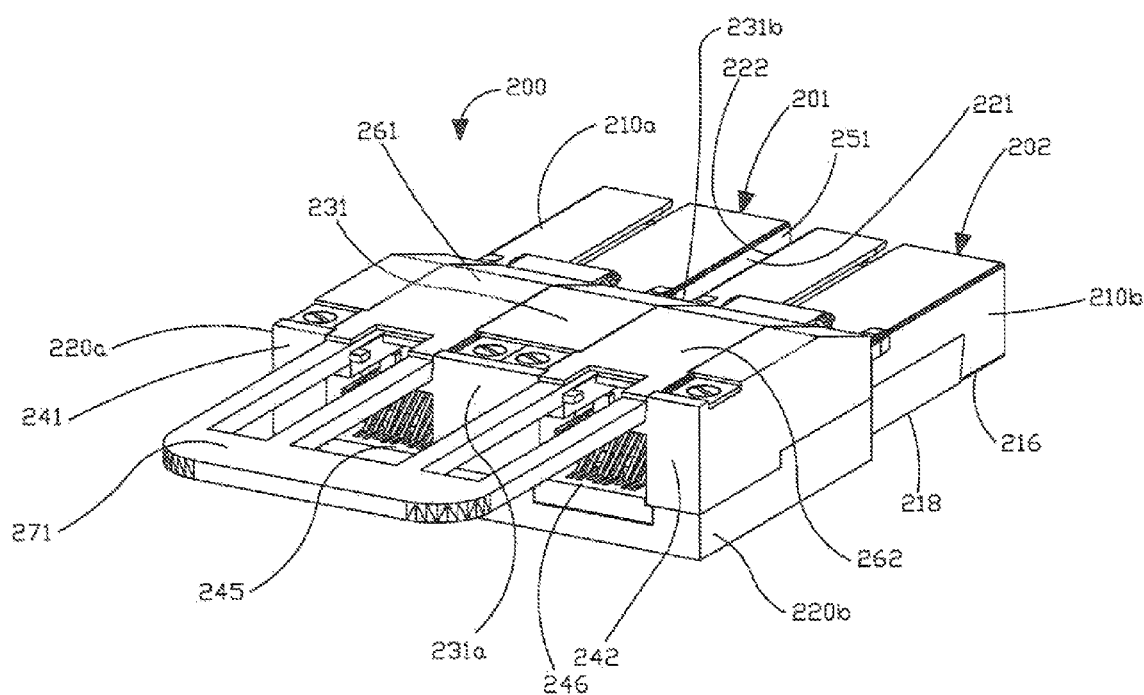
FIG. 7 is a perspective view of an alternate embodiment of the multi-channel transceiver module of the present invention.

FIG. 7 depicts an alternate embodiment of the present invention. The transceiver module housing 200 provides a two channel module that includes a first channel body 201 and a second channel body 202. Each channel body 201, 202 includes a male plug end 210a, b. The male plug ends 210a, b, each include an electrical connector 216 exposed on the bottom side 218 of each channel body 201, 202. Each male plug end 210a, b is received by, a receptacle cage of a host device when the entire module 206 is mated to the host device so that the pair of channel bodies 201, 202 are received simultaneously by the host device using a single insertion force by an operator.

Opposite the male plug end 110a, b is the receptacle end 220a, b provided lift each channel body 201, 202. A first sidewall 221 on the first channel body 201 is provided opposite a second side wall 222 of the second channel body 202. A bridge 231 is disposed between the first sidewall 221 and second sidewall 222. A first end face 241 is provided at the receptacle end 220a of the first channel body 201, and a second end face 242 is provided at the receptacle end 220b of the second channel body 202. A first side of the bridge 231a is formed co-extensively between the first end face 241 and second end face 242. The bridge includes a second side 231b.

A first receptacle opening 245 is disposed at the end face 241 of the first channel body 201 and a second receptacle opening 246 disposed at the end face 242 of the second channel body 202. As depicted in FIG. 7, the receptacle openings 245, 246 are RJ45 receptacles, as are well-known in the industry and receive RJ45 jacks insertable therein. In order to accommodate the width of the RJ45 receptacle openings 245, 246, the receptacle end 220a, b has been enlarged to have an outer profile of the housing 200 that is greater than the profile of the male plug end 210a, b. However, in other embodiments, where other types of receptacle openings are provided that may be smaller than a RJ45 receptacle, the receptacle end 220a, b may be co-extensive with the width and height of the male plug end 210; b. As well, the present invention may provide an optical transceiver module solution and in that instance the receptacles 245, 246 will be adapted to receive an optical plug such as an LC type optical connector.

A gap 251 is provided between the first wall 221 and second wall 222 of the first channel body 201 and second channel body 202, respectively. The gap 251 extends from the terminal end of each male plug end 210a, b and extends to the second side of the bridge 231b. Thus, it may be understood that each male plug end 210a, b can be received in separate receptacle cages of the host device with the gap 251 straddling the wall between the pair of receptacle cages.

A latch mechanism 261 is provided on the first channel body 201 and a second latch mechanism 262 is provided on the second channel body 202. A single bail lever 271 is provided that is attached to each latch mechanism 251, 262. By pulling on the bail lever 271, the latch mechanisms 261, 262 slide and are released, so that the module housing may be removed, from a host device. The bail lever 271 is generally U-shaped and includes legs that each actuate the corresponding latch mechanism 261, 262. In an embodiment, the module depicted in FIG. 7 conforms with a CXP form factor ftp://ftp.seagate.com/sff/SFF-8642.PDF, which is incorporated herein by reference. The latching mechanisms 261, 262 comply with the CXP form factor multi-source agreement. Thus, it is understood, while the CXP form factor calls for a simplex or single transceiver module, each having a latching mechanism; the present invention provides for a compliant latch mechanism 261, 262; however, as improved in the present invention, each latch mechanism 261, 262 is actuated by a single bail lever 271. Because the channel bodies 201, 202 are joined by the bridge 231 and provide for a unitary duplex transceiver module, a single bail lever 271 may easily actuate both latch mechanisms 261, 262.

Figure 8:
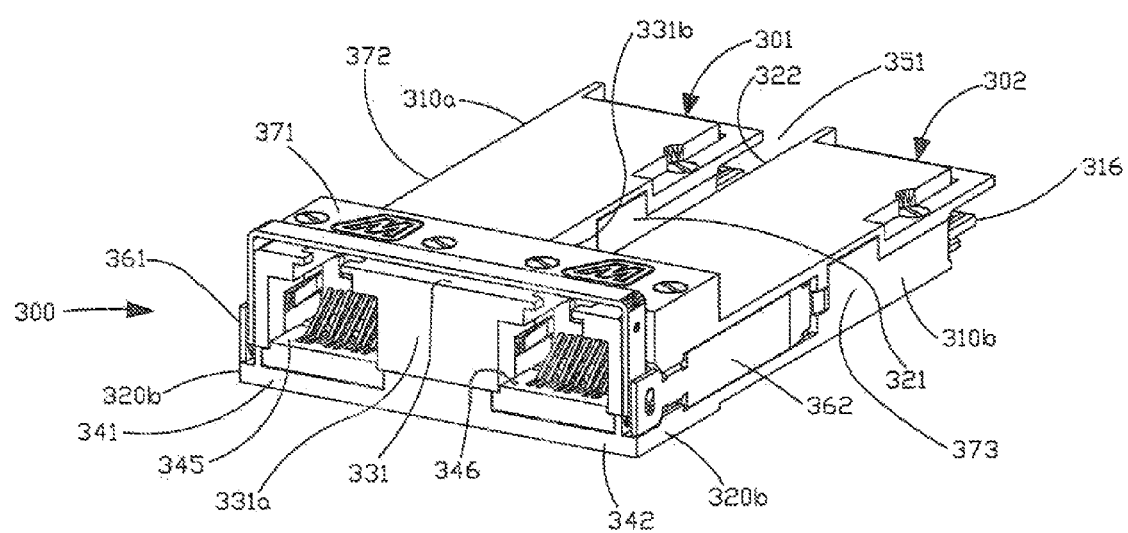
FIG. 8 is a perspective view of a further alternate embodiment of a multi-channel transceiver module of the present invention.

Turning to FIG. 8, a third embodiment of the present invention will be described. The multi-channel transceiver module depicted in FIG. 8 includes a housing 300 having a first channel body 301 and a second channel body 302. Each channel body 301, 302 includes a male plug end 310a, b. An electrical connector 316 is formed at each male plug end 310a, b at the terminal end of each channel body 301, 302. In the embodiment depicted in FIG. 8, the module 300 complies with the QSFP form factor and includes an electrical connector 316 compliant with the multi-source agreement of the QSFP form factor ftp://ftp.seagate.com/sff/INF-8438.PDF, which is incorporated herein by reference. As discussed above, each male plug end 310a, b is received by a receptacle cage of a host device when the entire module 300 is mated to the host device, so that the pair of channel bodies 301, 302 are received simultaneously by the host device using a single insertion force by an operator.

Opposite the male plug end 310a, b is the receptacle end 320a, b provided for each channel body 301, 302. A first sidewall 221 on the first channel body 301 is provided opposite a second, side wall 322 of the second channel body 302. A bridge 331 is disposed between the first sidewall 321 and second sidewall 322. A first end face 341 is provided at the receptacle end 320a of the first channel body 301, and a second end face 342 is provided at the receptacle end 320b of the second channel body 302. A first side of the bridge 331a is formed co-extensively between the first end face 341 and second end face 342. The first and second end faces 341, 342 form a wall that is shared and extending between the first channel 301 the second channel 302. In an embodiment, the wall is formed by a monolithic housing 300 having a planar major surface forming a single plane extending between the at least two channels and end faces 341, 342. The bridge includes a second side 331b.

A first receptacle opening 345 is disposed at the end face 341 of the first channel body 301 and a second receptacle opening 346 disposed at the end face 342 of the second channel body 302. As depicted in FIG. 8, the receptacle openings 345, 346 are for RJ45 receptacles, as are well-known in the industry and receive RJ45 jacks insertable therein. In order to accommodate the width of the RJ45 receptacle openings 345, 346, the receptacle end 320a, b has been enlarged to have a height of the housing 300 that is greater than the height dimension of the male plug end 310a, b. However, in other embodiments, where other types of receptacle openings are provided that may be smaller than a RJ45 receptacle, the receptacle end 320a, b may be co-extensive with the width and height dimensions of the male plug end 310a, b.

A gap 351 is provided between the first wall 321 and second wall 322 of the first channel body 301 and second channel body 302, respectively. The gap 351 extends from the terminal end of each male plug end 310a, b and extends to the second side of the bridge 331b. Thus, it may be understood that each male plug end 310a, b can be received in separate receptacle cages of the host device with the gap 351 straddling the wall between the pair of receptacle cages.

A latch mechanism 361 is provided on a side of the first channel body 301 and a second latch mechanism 362 is provided on a side of the second channel body 302. A single bail lever 371 is provided that is attached to each latch mechanism 361, 362. By pulling on the bail lever 371 it rotates about 90° and the latch mechanisms 361, 362 slide and are released, so that the module housing may be removed from a host device. The bail lever 371 is generally U-shaped and includes legs that each actuate the corresponding latch mechanism 361, 362. In an embodiment, the module depicted in FIG. 8 conforms with a QSFP form factor ftp://ftp.seagate.com/sff/INF-8438.PDF, which is incorporated herein by reference. The latching mechanisms 361, 362 comply with the QSFP form factor multi-source agreement. Thus, it is understood, while the QSFP form factor calls for a single transceiver module, each having a latching mechanism on its sides; the present invention provides for a compliant latching mechanism 361, 362; however, that are joined by a single bail lever 371 and provide the latch mechanism 361 only on the outside wall 372 of the first channel body 302 and the latch mechanism 362 only on the outside wall 373 of the second channel body 302. Although the latch mechanisms are omitted from the walk 321, 322 of the first and second channel bodies 301, 302, respectively; the channel bodies 301, 302 are still matable with a standard cage receptacle built to conform to the multi-source agreement from factor and the latch mechanisms 361, 362 provide sufficient retention force to hold the pair of channel bodies 301, 302 within the cage receptacles of the host device. Each of the embodiments of the present invention, while providing a multi-channel module, may also be matable with a standard receptacle cage that may receive a single channel module (and multi-channel module). Because the channel bodies 301, 302 of the module 300 are joined by the bridge 331 that provide for a unitary transceiver module, a single bail lever 371 may easily actuate both latch mechanisms 361, 362.

Figure 9:
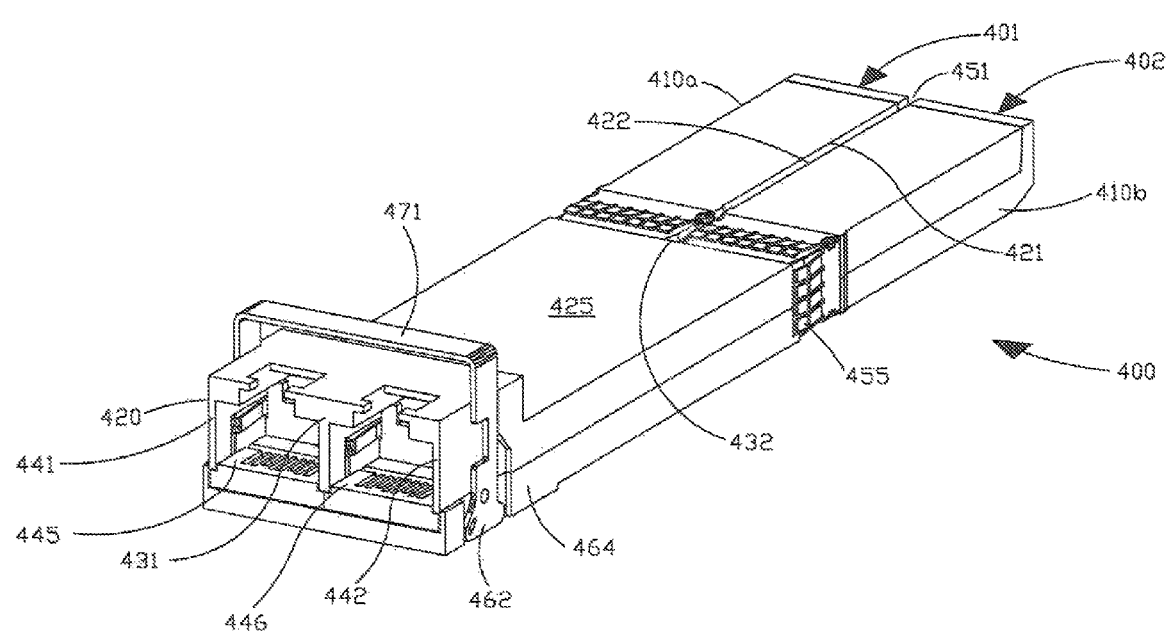
FIG. 9 is a perspective view of a further alternate embodiment of a multi-channel transceiver module of the present invention.
Figure 10:
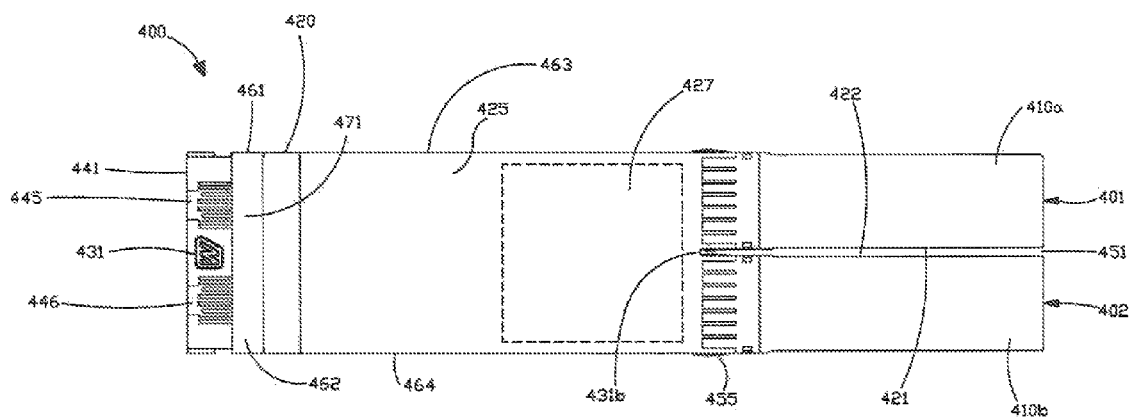
FIG. 10 is a plan view of the module of FIG. 9.

Turning to FIGS. 9-10, a further alternate embodiment of a multi-channel transceiver module 400 is depicted. The transceiver module housing 400 includes a first channel body 401 and a second channel body 402. Each channel body 401, 402 includes a male plug end 410a, b. The male plug ends 410a, b, each include an electrical connector 416 exposed on the bottom side 418 of each channel body 401, 402. As discussed above, each male plug end 410a, b is received by a receptacle cage of a host device when the entire module 400 is mated to the host device, so that the pair of channel bodies 401, 402 are received simultaneously by the host device using a single insertion force by an operator.

Opposite the male plug end 410a, b is the receptacle end 420. A first sidewall 421 on the first channel body 401 is provided opposite a second side wall 422 of the second channel body 402. An extended housing 425 acts as a bridge to join the first and second channel bodies 401, 402. A first end face 441 is provided at the receptacle end 420 and a second end face 442 is provided at the receptacle end 420. A wall 431 is formed co-extensively between the first end face 441 and second end face 442. The extended housing includes an end 432.

A first receptacle opening 445 is disposed at the end face 441 of the first channel body 401 and a second receptacle opening 446 disposed at the end face 442 of the second channel body 402. As depicted in FIG. 9, the receptacle openings 445, 446 are for RJ45 receptacles, as are well-known in the industry and receive RJ45 jacks insertable therein. In order to accommodate the width of the RJ45 receptacle openings 445, 446, the receptacle end 420a, b has been enlarged to have an outer profile of the housing 400 that is greater than the profile of the male plug end 410a, b. However, in other embodiments, where other types of receptacle openings are provided that may be smaller than a RJ45 receptacle, the receptacle end 420a, b may be co-extensive with the height of the male plug end 410a, b.

A gap 451 is provided between the first wall 421 and second wall 422 of the first channel body 401 and second channel body 402, respectively. The gap 451 extends from the terminal end of each male plug end 410a, b and extends to the extended housing end 432. Thus, it may be understood that each male plug end 410a, b can be received in separate receptacle cages of the host device with the gap 451 straddling the wall between the pair of receptacle cages.

A latch mechanism 461, is provided on the first outer side wall 463 and a second latch mechanism 462 is provided on the outer side wall 464. A single bail lever 471 is provided that is attached to each latch mechanism 462. By pulling on the bail lever 471, the latch mechanisms 462 are released so that the module housing may be removed from a host device. The bail lever 471 is generally U-shaped and includes legs that each actuate the corresponding latch mechanism 461, 462. In an embodiment, the module depicted in FIGS. 9 and 10 conforms with a SFP+ form factor ftp://ftp.seagate.com/sff/SFF-8432.PDF, which is incorporated herein by reference. The latching mechanisms 461, 462 comply with the SFP+ form factor multi-source agreement. Thus, it is understood, while the SFP+ form factor calls for a simplex or single transceiver module, each having a latching mechanism; the present invention provides for a compliant latching mechanism 461, 462 however, that are joined by a single bail lever 471. Because the channel bodies 401, 402 are joined by the extended housing 425 and to provide for 6 unitary duplex transceiver module, a single bail lever 471 may easily actuate both latch mechanisms 461, 462.

The receptacle end 410a, b of the housing 400 includes an extended housing 425 which provides an enlarged interior cavity for mounting supplemental components. For example, an extended housing 425 may provide an interior cavity for mounting a printed circuit board having sufficient area for mounting of a component having a footprint of at least 21 mm×21 mm. For example, a PHY chip 427 may be provided for handling transmissions of up to 10 Gigabits per second. The internal area on the printed circuit board is at least 21 mm×21 mm. In an embodiment, the extended housing 425 is even larger and can accommodate a PHY chip having a footprint of 25 mm×25 mm.

A grounding clip 455 is provided at the transition area between the extended body 425 and the male plug end 410a, b. The grounding clip 455 will mate with the faceplate of the host device into which the module 400 is inserted.

Figure 11:
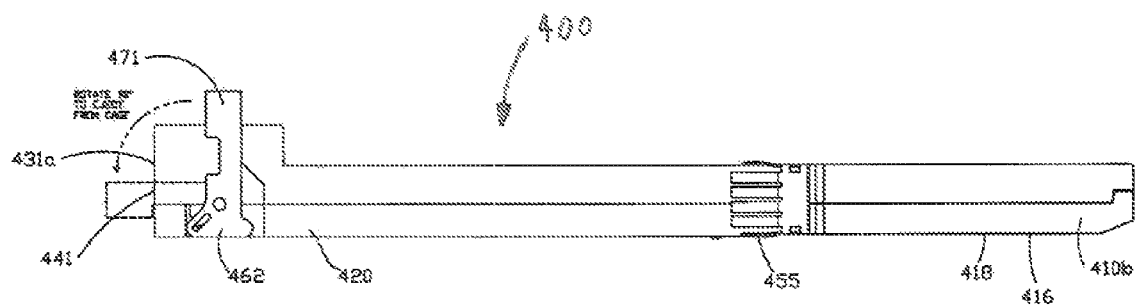
FIG. 11 is a side elevation view of the module of FIG. 9.
Figure 12:
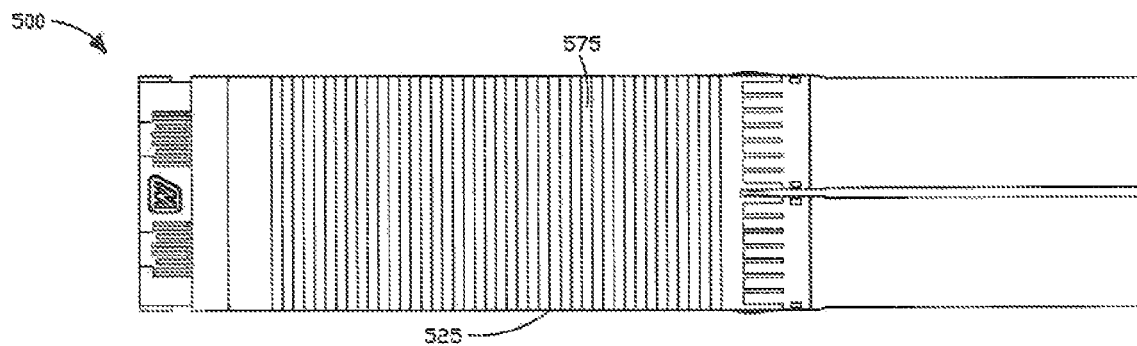
FIG. 12 is an alternate embodiment of a multi-channel transceiver module of the present invention.
Figure 13:
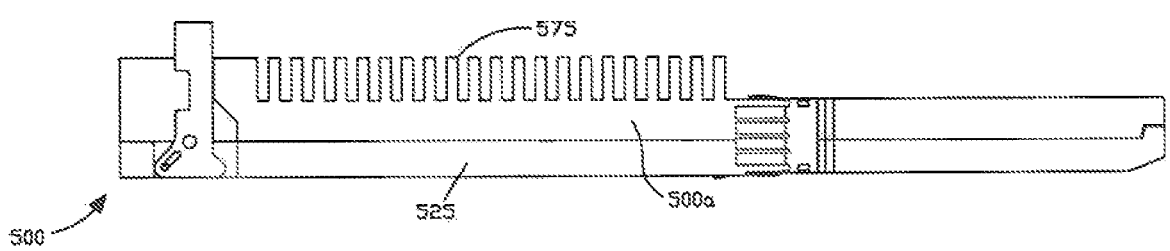
FIG. 13 is a side elevation view of the module of FIG. 12.

Turning to FIGS. 12-13, a further alternate embodiment of the present invention will be described. A multi-channel transceiver module 500 is depicted that is similar with respect to the multi-channel transceiver module 400 described with respect to FIGS. 9-11. The improvement in multi-channel module 500 is the inclusion of a heat sink 575 disposed on the extended housing 525. In an embodiment, the heat sink 575 is formed by multiple fins extending transversely across, the width of the top of the extended housing 525 and are combined as a unitary member. The heat sink may be clamped onto the top of the housing 525 or formed as part of the top half 500a of the clam shell housing assembly. The heat sink 575 is formed of well-known metallic components that can dissipate heat from within the extended housing components mounted therein.

Figure 14:
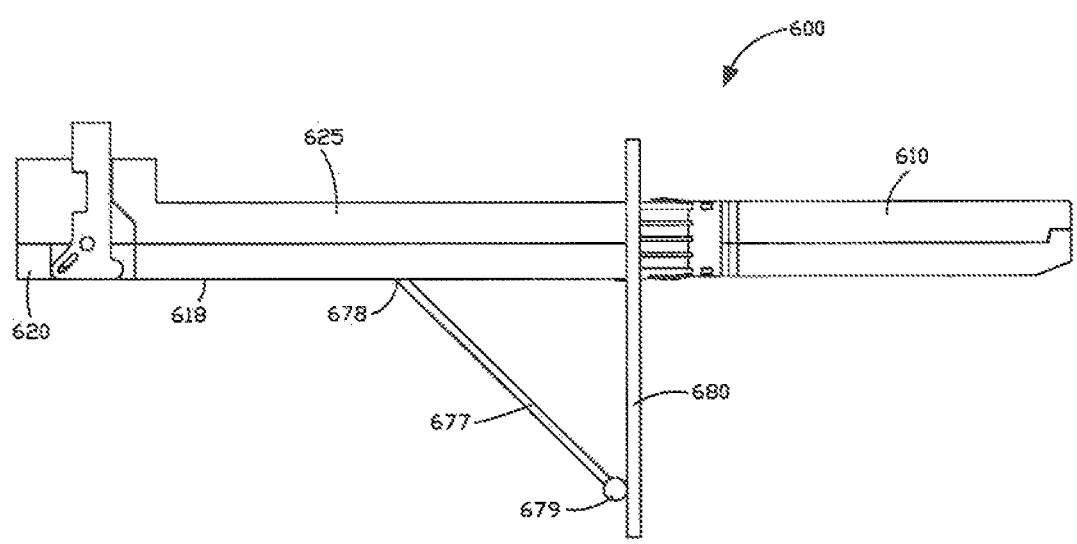
FIG. 14 is a side elevation view of an alternate embodiment of a multi-channel transceiver module of the present invention.
Figure 15:
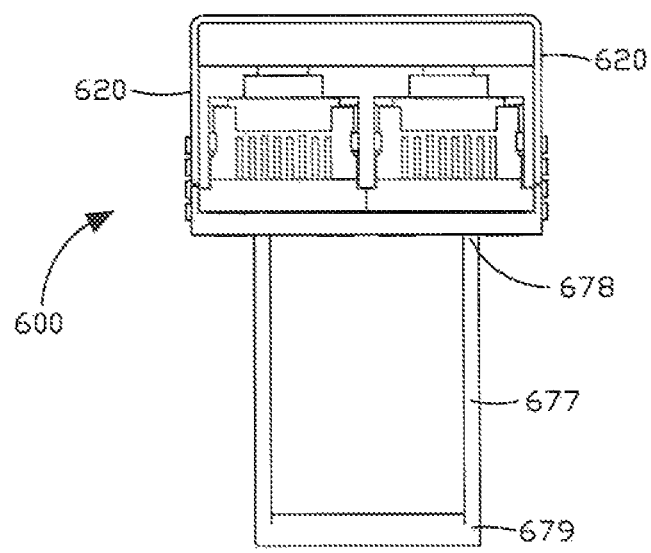
FIG. 15 is an end view of the module of FIG. 14.

Turning to FIGS. 14-15, a further alternate embodiment of a multi-channel transceiver module of the present invention is depicted. The transceiver module 600 is similar in many respects to the transceiver module 400 described with respects to FIGS. 9-11 above. The main improvement of the transceiver module 600 is the inclusion of a support arm 677 which extends from the extended housing 625 in order to support the housing 625 when the module is mated with a host device. In an embodiment, the support 677 may be pivotally attached at point 678 to the bottom 618 of the extended housing 625. The support arm 677 includes a terminal point 679 that abuts against a faceplate or bezel 680 of the host device. As shown in FIG. 14, when the module 600 is inserted through the bezel 680 the male plug end 610 is completely received within the host device and the extended housing 625 extends away from the host device. The support arm 677 is pivoted forward until the terminal point 679 abuts the faceplate of the bezel 680, so that the extended housing 625 and receptacle end 620 may be supported. It is well understood in the art that the receptacle end 620 has receptacle openings for receiving cable ends therein. The cables mated to the receptacle 620 may be many meters in length and can have great weight that acts on the receptacle end 620, which is placed at a great distance along the extended body 625 from the bezel 680 of the host device. In order to counteract the significant weight that may be placed at the receptacle end 620, the support arm 677 supports the extended housing 625.

Figure 16:
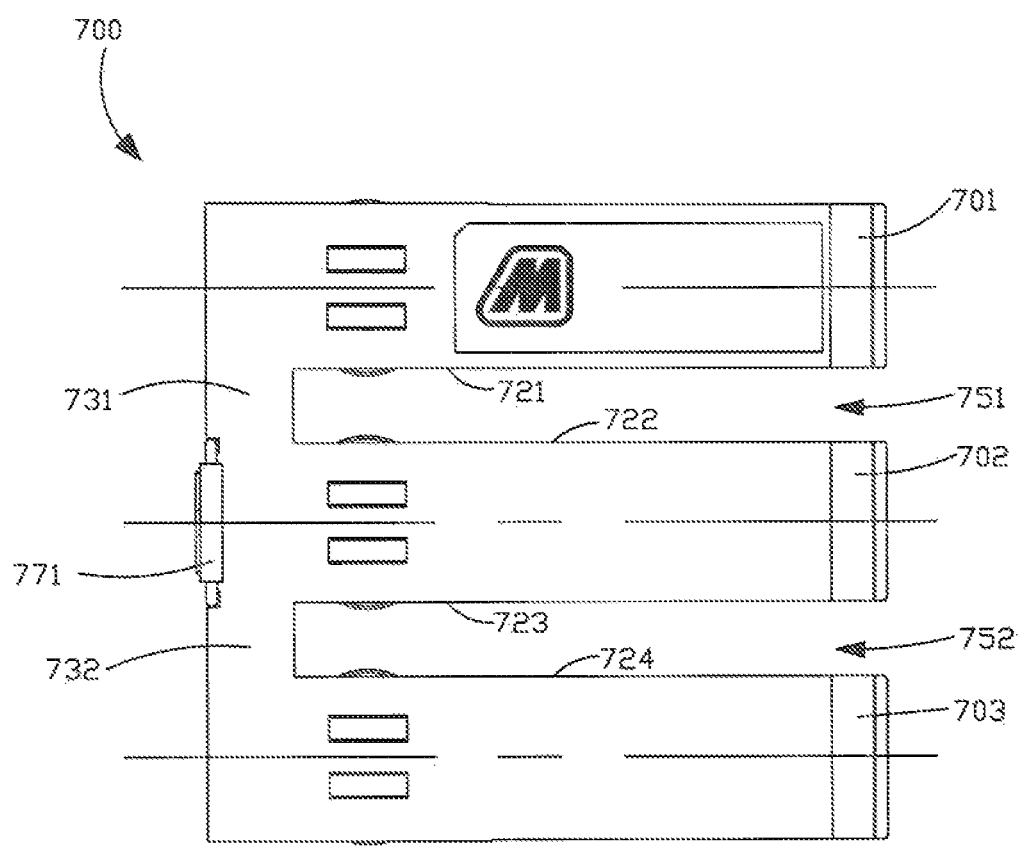
FIG. 16 is a plan view of a further alternate embodiment of a multi-channel transceiver module of the present invention.
Figure 17:
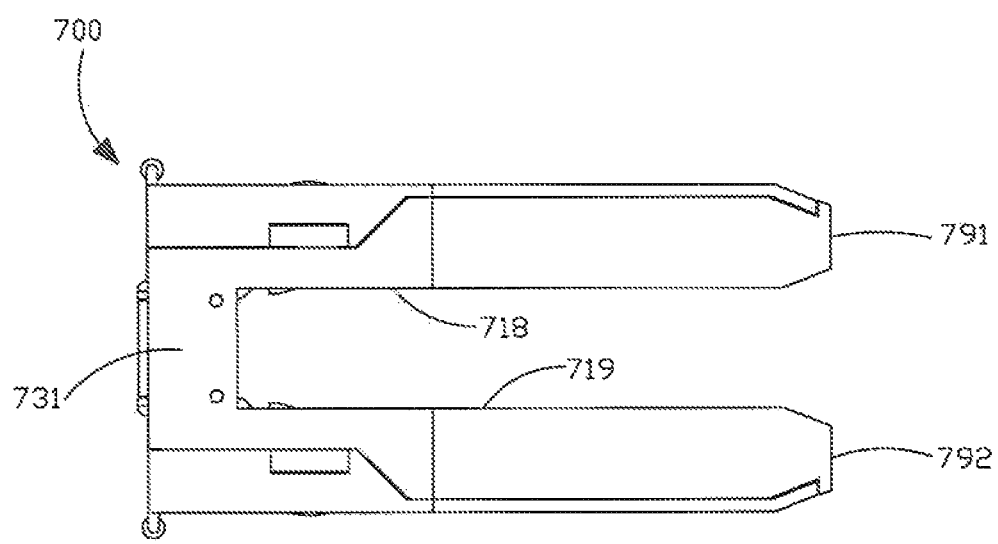
FIG. 17 is a side elevation view of the multi-channel transceiver module of FIG. 16.
Figure 18:
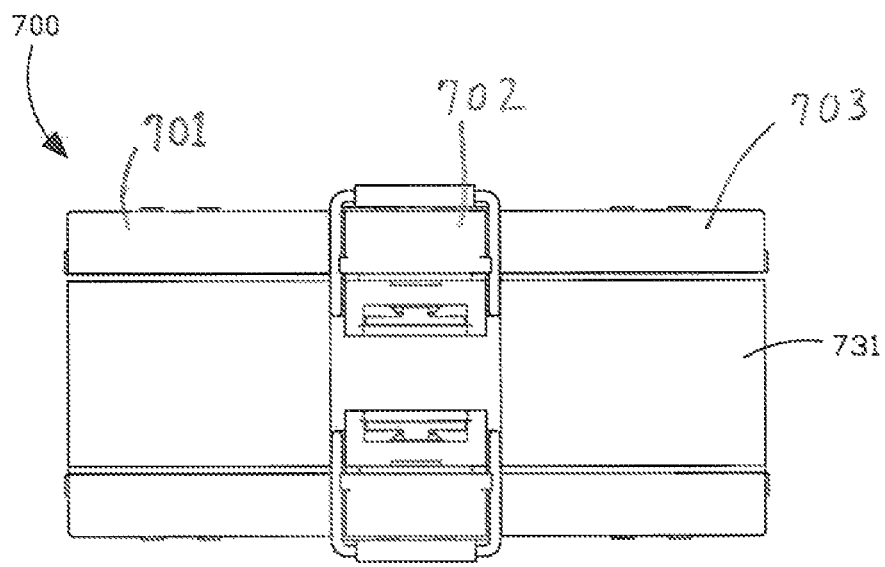
FIG. 18 is an end view of the multi-channel transceiver module of FIG. 16.

Turning to FIGS. 16-18, a further alternate embodiment of a multi-channel transceiver module 700 is depicted. The module 700 is similar to the multi-channel module described with respect to FIGS. 2-6 above; however, the multi-channel module 700 includes three channel bodies 701, 702, 703 in a ganged/horizontal layout of first row 791 and a stacked/vertical layout. Each channel body 701, 702, 703 is divided by a gap 751, 752. Each gap 751, 752 is wider than the gaps previously described in order that the module can be received by a host device that has separate receptacle cages for each individual transceiver module. In an embodiment, the gap 751, 752 is approximately 250 of an inch.

In an embodiment, the module 700 includes a single bail lever 771. The bail lever 771 is centered on the housing 71 so that it is co-extensive with second channel body 702. In an embodiment, the bail lever 771 is engaged with a single latch mechanism (not depicted). The latch mechanism is similar to the latch mechanism described previously with respect to FIGS. 2-6. As depicted in FIG. 16, the channel body 701, 702, 703 are oriented in a side by side orientation where the first bridge 731 extends between a first sidewall 721 of the first channel body 701, and a second sidewall 722 of a second channel body. Further, the second bridge 732 extends between a third sidewall 723 of the second channel body and a fourth sidewall 724 of the third channel body 703.

The module as depicted in FIGS. 17 and 18, shows top row 791 having three channel bodies and bottom row 792 having three channel bodies comprising a total of six channel bodies. There are three channel bodies 701, 702, 703 forming the first row 791. The first row of channel bodies 791 are oriented stacked or belly to belly with a second row of channel bodies 792. Therefore, there is an additional vertical bridge 731 that extends from the first bottom surface 718 of the first row 791 of channel bodies and the second bottom surface 719 of the second row 792 of channel bodies. Thus, it may be understood that the module 700 can populate a total of six ports of a host device simultaneously with a single insertion step. In other words, the three ports in the top row 791 and the three ports in the bottom row 792 of a host device, such as a blade having dual rows can be populated quickly. In the embodiment depicted in FIGS. 17 and 18, the module is a test module. However, a similar multi-row, multi-channel transceiver module such as module 700 having receptacle openings at the receptacle end for receipt of cable ends, as discussed above.

The matter set forth in the foregoing description and accompanying descriptions is offered by way of illustration only and not as a limitation. While particular embodiments have been shown and described, it will be obvious to those skilled in the art that changes and modifications may be made without departing from the broader aspects of applicant's contribution. The actual scope of the protection sought is intended to be defined in the following claims when viewed in their proper perspective when based on the prior art.

What is claimed:

1. A multi-channel transceiver module comprising:
a unitary housing having at least a first channel body and second channel body each channel body having a male plug end, a top-side, a bottom side and a receptacle end, the male plug end having an electrical connector exposed on the bottom side of each channel body;
a bridge member for joining the first and second channel bodies, the bridge member disposed at the receptacle end and the bridge member providing an expanded interior cavity capable of holding electronic components and at least one printed circuit board, the interior cavity formed by a first side wall of the bridge member and an opposite second side wall of the bridge member and the first side wall disposed between the first and second channel bodies, the first side wall substantially coextensive with an end face of each channel body;
a gap provided between the plug ends of each channel body, the gap extending from each plug end to the bridge member to partially divide each channel body so that each plug end is insertable within a separate receptacle cage of a host device;
a latch mechanism and a latch lever disposed on the housing, the latch lever for interacting with the latch mechanism on order to facilitate removal of the module from within a receptacle cage; and
the latch lever located on the housing in a generally centered position with respect to the channel bodies and a single movement of the latch lever activates the latch mechanism.

2. The multi-channel transceiver of claim 1, wherein the bridge member is co-extensive with the end face of the receptacle end, the end face surrounding an aperture that forms a multi-contact electrical connector receptacle adapted for receiving a cable plug, so that a first end face is provided at the first channel body and a second end face is provided at the second channel body, each end face being integrally joined by the bridge member, the first and second end face defining a plane and the first side wall of the bridge being generally co-extensive with the first and second end faces.

3. The multi-channel transceiver of claim 1, wherein the receptacle ends and the bridge are formed (or cast) from the same material.

4. The multi-channel transceiver of claim 3, wherein the receptacle ends and the bridge are stamped from the same metal.

5. The multi-channel transceiver of claim 3, wherein the receptacle ends and the bridge are formed of a polymer material from the same mold.

6. The multi-channel transceiver of claim 1, wherein the receptacle end is closed and the transceiver is adapted to perform as a test module.

7. The multi-channel transceiver of claim 6, wherein the transceiver is a loopback module so that a transmitted signal received by the transceiver is returned to a host device.

8. The multi-channel transceiver of claim 1, further comprising latch mechanisms disposed on each channel body for securing the module housing within a cage of a receptacle of a host device to which the module housing is inserted and at least one latch lever straddling the latch mechanisms and the latch lever simultaneously operating the at least two latch mechanisms.

9. The multi-channel transceiver of claim 8, wherein the housing further having a third channel body.

10. The multi-channel transceiver of claim 9, wherein the latch mechanism is disposed at the receptacle end of the channel body located in a center position of the housing.

11. The multi-channel transceiver of claim 9, wherein the housing further having a fourth channel body.

12. The multi-channel transceiver of claim 11, wherein the housing includes a pair of latch mechanisms and the pair of latch mechanisms located at the receptacle end of each of the channel bodies located in a center position of the housing.

13. The multi-channel transceiver of claim 12, wherein each of the first and second channel bodies are oriented side by side so that the bridge extends between a first side wall of the first channel body and a second side wall of the second channel body.

14. The multi-channel transceiver of claim 8 wherein the number of latch mechanisms (L) with respect to the number of channel bodies (B) is:
L≤B when B is 2;
L=1 when B is 3; or
L=2 when B is 4.

15. The multi-channel transceiver of claim 14 wherein channel bodies are numbered from left to right B1 to B4 and the centered location of the latch lever is:
B1 or B 2 when B is 2;
B2 when B is 3; or
B2 and B3 when B is 4.

16. The multi-channel transceiver of claim 1, wherein each of the first and second channel bodies are oriented belly to belly so that the bridge extends between a first bottom surface of the first channel body and a second bottom surface of the second channel body, each bottom surface including an aperture exposing contact blades at the male plug end.

17. The multi-channel transceiver of claim 1, wherein at least one monolithic printed circuit board (PCB) is disposed within the housing and extends between the first channel body and second channel body and the PCB including components mounted thereon whose functionality is shared between the first channel and second channel body.

18. The multi-channel transceiver of claim 17 further comprising an extended housing at the receptacle end for mounting the shared components, the extended housing in communication with each of the first and second channel bodies, and the extended housing forming a cavity for receipt of a PCB having at least a 21 mm×21 mm mounting area.

19. The multi-channel transceiver of claim 18, wherein a 10 gigabit PHY chip having a footprint of at least approximately 21 mm×21 mm is mounted on the PCB so that the first channel and second channel may process data at a rate of up to 10 gigabits/second.

20. The multi-channel transceiver of claim 19, wherein the PCB is mounted within the extended housing and interconnected with circuitry provided at the male plug ends of each of the first and second channel bodies.

21. The multi-channel transceiver of claim 1, wherein the transceiver is compliant with one of an SFP, SFP+, SFP to RJ45, CXP, CXP to RJ45, QSFP and QSFP to RJ45 form factor.

22. The multi-channel transceiver of claim 1, wherein a support arm extends from a bottom surface to support the receptacle end, the support arm being braced against a faceplate through which the male plug end is inserted.

23. The multi-channel transceiver of claim 22, wherein the support arm is retractably mounted at the receptacle end.

24. The multi-channel transceiver of claim 1, wherein a monolithic heat sink member is provided that extends between the first channel body and the second channel body.

25. The multi-channel transceiver of claim 24, wherein the heat sink includes fins integrally formed with the housing.

26. The multi-channel transceiver of claim 1 further comprising a bail lever extending between the first channel body and a second channel body, the bail lever for releasing a latch mechanism.

27. The module of claim 1, the module further comprising a third channel body disposed adjacent the second channel body and a latch lever disposed on the second channel body and providing equal pull force on each of the first, second and third channel bodies in order to allow for uniform withdrawal of the module from a receptacle.

28. The module of claim 27, further comprising a fourth channel body disposed adjacent the third channel body and a second latch mechanism disposed adjacent the third channel body and the first and fourth channel bodies having no latch mechanism for securing the module within a cage receptacle, and the latch lever straddling the second and third channel bodies.

29. The module of claim 1 wherein at least two PCBs are mounted within the housing.

30. The module of claim 1 wherein the expanded interior cavity has a PCB mounted therein and the PCB extending into the first and second channel body areas.

31. The module of claim 1 wherein the electrical connector is integrally formed with the PCB and the PCB having a terminal portion extending outward in a direction opposite the receptacle end and the terminal portion including contact fingers providing at least ten signal lines.

32. The multi-channel transceiver of claim 2 wherein the multi-contact electrical connector receptacle is an RJ-45 connector receptacle.

* * * * *